(12) United States Patent
Zhang et al.

(10) Patent No.: US 11,338,662 B2
(45) Date of Patent: May 24, 2022

(54) HYBRID POWER COUPLING MECHANISM AND VEHICLE

(71) Applicant: Guangzhou Automobile Group Co., Ltd., Guangdong (CN)

(72) Inventors: Anwei Zhang, Guangdong (CN); Hao Yu, Guangdong (CN); Jiangling Zhao, Guangdong (CN); Liang Zhang, Guangdong (CN); Cunxiang Wu, Guangdong (CN); Qianru Su, Guangdong (CN); Jun Guo, Guangdong (CN); Yong Yang, Guangdong (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 0 days.

(21) Appl. No.: 16/341,462

(22) PCT Filed: Oct. 24, 2018

(86) PCT No.: PCT/CN2018/111570
§ 371 (c)(1),
(2) Date: Apr. 12, 2019

(87) PCT Pub. No.: WO2019/237626
PCT Pub. Date: Dec. 19, 2019

(65) Prior Publication Data
US 2021/0362582 A1      Nov. 25, 2021

(30) Foreign Application Priority Data

Jun. 12, 2018   (CN) .......................... 201810601315.X

(51) Int. Cl.
*B60K 6/48*       (2007.10)
*B60K 6/365*      (2007.10)
(Continued)

(52) U.S. Cl.
CPC ................. *B60K 6/48* (2013.01); *B60K 6/365* (2013.01); *B60K 6/387* (2013.01); *B60K 6/547* (2013.01); *B60K 2006/4825* (2013.01)

(58) Field of Classification Search
CPC .......... B60K 6/48; B60K 6/365; B60K 6/387; B60K 6/547; B60K 2006/4825
See application file for complete search history.

(56) References Cited

U.S. PATENT DOCUMENTS

| 6,018,198 A | 1/2000 | Tsuzuki et al. |
| 8,870,698 B2 * | 10/2014 | Mack ..................... H02K 7/003 |
| | | 475/150 |

(Continued)

FOREIGN PATENT DOCUMENTS

| CN | 102107604 A | 6/2011 |
| CN | 103921667 A | 7/2014 |

(Continued)

*Primary Examiner* — David J Hlavka
(74) *Attorney, Agent, or Firm* — ScienBiziP, P.C.

(57) ABSTRACT

Some embodiments of the present disclosure provide a hybrid power coupling mechanism and a vehicle. The hybrid power coupling mechanism includes an engine, a first output shaft, a generator, a driving motor, and a differential mechanism, wherein a rotating shaft of the engine is connected to an input shaft of the generator through the first output shaft, and an input shaft of the driving motor is connected to the differential mechanism in a speed-reducing manner through a planetary gear set. The vehicle includes a power storage battery, a motor controller and the foregoing hybrid power coupling mechanism. The problems of power interruption and high cost in mode switching of a hybrid power coupling mechanism of the existing vehicle are solved. The engine and the generator operate in an extended range mode, and the driving motor is decelerated by the planetary gear set and inputs power to the differential mechanism.

18 Claims, 2 Drawing Sheets

(51) Int. Cl.
*B60K 6/387* (2007.10)
*B60K 6/547* (2007.10)

(56) References Cited

U.S. PATENT DOCUMENTS

| | | | |
|---|---|---|---|
| 9,156,348 B1* | 10/2015 | Swales | B60K 17/16 |
| 9,561,719 B2* | 2/2017 | Lo | B60K 6/52 |
| 2002/0019284 A1* | 2/2002 | Aikawa | B60K 6/547 |
| | | | 475/150 |
| 2013/0012347 A1* | 1/2013 | Ortmann | B60K 6/387 |
| | | | 475/5 |
| 2013/0203543 A1* | 8/2013 | Sten | F16H 48/36 |
| | | | 475/150 |
| 2017/0136867 A1* | 5/2017 | Holmes | F16H 3/725 |
| 2017/0274754 A1* | 9/2017 | Imamura | B60W 20/10 |

FOREIGN PATENT DOCUMENTS

| | | |
|---|---|---|
| CN | 204161081 U | 2/2015 |
| CN | 104742730 A | 7/2015 |
| CN | 107054050 A | 8/2017 |
| CN | 206749516 U | 12/2017 |
| CN | 206749517 U | 12/2017 |
| CN | 206914128 U | 1/2018 |
| CN | 107985058 A | 5/2018 |
| CN | 108128138 A | 6/2018 |
| CN | 208290956 U | 12/2018 |
| CN | 208359906 U | 1/2019 |
| WO | 2015099594 A1 | 7/2015 |

* cited by examiner

HYBRID POWER COUPLING MECHANISM AND VEHICLE

TECHNICAL FIELD

The present disclosure relates to a technical field of vehicle power systems, and more particularly to a hybrid power coupling mechanism and a vehicle.

BACKGROUND

A power system includes an engine (internal combustion engine) and a transmission system consisting of a transmission, a differential mechanism and a transmission shaft. Its function, is to provide a driving power required for a driving wheel for a vehicle. The internal combustion engine has a certain speed and torque range, and achieves the best working state in a small range, which is either the least fuel consumption or the lowest harmful emissions, or both. However, the actual road conditions are ever-changing, not only in the speed of the driving wheel, but also in a torque required by the driving wheel. Therefore, good matching of an optimal speed and torque of the internal combustion engine, that is, an optimal power state, and a driving wheel power state is the primary task of the transmission.

In recent years, the birth of a motor hybrid power technology has opened up a new way to achieve complete power matching between the internal combustion engine and a power wheel. Among many power assembly designs, the most representative ones are series hybrid systems and parallel hybrid systems. In the motor series hybrid system, an internal combustion engine, a generator, a motor, a shaft system and a driving wheel constitutes a series power chain, and the power assembly structure is simple. The generator and motor combination can be regarded as a transmission in the traditional sense. When used in conjunction with an accumulator such as a battery and a capacitor, the transmission can be used as an energy adjustment device to achieve independent adjustment of speed and torque.

The advantageous of the series hybrid system are simple structure, flexible layout and low cost, which is very suitable for the hybridization of smaller vehicles, can achieve fuel consumption reduction, and is small in vehicle cost increment.

The related electric vehicle power coupling mechanism includes: an engine; a generator, coaxially connected to the engine; a clutch, disposed between the engine and the generator; and a driving motor, connected to the clutch and a differential mechanism through a transmission device. The electric vehicle power coupling mechanism has reasonable layout and compact structure, is advantageous for assembly and space saving, and improves the utilization of the interior space of the vehicle, but has the following disadvantages:

1) Power is interrupted during mode switching.

2) The system includes the clutch, which needs to be equipped with a hydraulic system, so that the cost is high, and it is not suitable for the hybridization of an A-class vehicle.

3) The engine and the generator are directly connected, so that the efficiency of the engine and the generator is low.

SUMMARY

Technical Problem

The technical problem to be solved by an embodiment of the present disclosure is to provide a hybrid power coupling mechanism for the problems of power interruption and high cost in mode switching of the related hybrid power coupling mechanism.

Technical Solution

The technical solution adopted for solving the above technical problem by the present application is as follows: a hybrid power coupling mechanism is provided, which includes an engine, a first output shaft, a generator, a driving motor, and a differential mechanism, wherein a rotating shaft of the engine is connected to an input shaft of the generator through the first output shaft, and an input shaft of the driving motor is connected to the differential mechanism in a speed-reducing manner through a planetary gear set.

In an exemplary embodiment, the planetary gear set includes a sun gear, a planetary carrier and a gear ring; one side of the sun gear is coupled to the input shaft of the driving motor, and the other side of the sun gear is meshed with an inner ring of the planetary carrier; and one side of the gear ring is connected to the differential mechanism, and the other side of the gear ring is meshed with an outer ring of the planetary carrier.

In an exemplary embodiment, the sun gear is a hollow gear, and a power output shaft connected to the differential mechanism and configured to drive a wheel end passes through the sun gear.

In an exemplary embodiment, the driving motor and the differential mechanism are arranged side by side, a third gear is disposed on the input shaft of the driving motor, and the sun gear is meshed with the third gear.

In an exemplary embodiment, the engine and the generator are arranged side by side, the rotating shaft of the engine is connected to the first output shaft, and the first output shaft is connected to the input shaft of the generator through an speed-increasing gear pair.

In an exemplary embodiment, the speed-increasing gear pair includes a first gear and a second gear meshed with each other, the first gear is connected to the first output shaft, the second gear is connected to the input shaft of the generator, and an outer diameter of the first gear is greater than that of the second gear.

In an exemplary embodiment, the hybrid power coupling mechanism includes a housing, wherein the generator, the driving motor, the speed-increasing gear pair, the planetary gear set and the differential mechanism are integrated in the housing.

In an exemplary embodiment, the engine is disposed outside the housing, and an end, connected to the first output shaft, of the rotating shaft of the engine extends into the housing.

In an exemplary embodiment, when the first gear, the second gear and the third gear are provided simultaneously, the first gear, the second gear and the third gear are disposed between the generator and the driving motor, and the first gear and the second gear are disposed on an outer side of the third gear with respect to an axial direction.

In an exemplary embodiment, the hybrid power coupling mechanism includes a torsion damper connected between the rotating shaft of the engine and the first output shaft.

In an exemplary embodiment, each of the generator and the driving motor is an electric generator.

In an exemplary embodiment, the hybrid power coupling mechanism comprises a pure electric mode and an extended range mode, wherein the engine and the generator, and the driving motor performs driving independently to establish the pure electric mode; and the engine drives the generator to generate electricity, and the driving motor performs driving independently to establish the extended range mode.

An embodiment of the present disclosure also provides a vehicle, including, a power storage battery, a motor controller connected to the power storage battery, and the foregoing hybrid power coupling mechanism, wherein the engine, the generator and the driving motor are connected to the motor controller and controlled by the motor controller.

In an exemplary embodiment, when the power storage battery has sufficient amount of charge, the motor controller controls the engine and the generator to be turned off, and controls the driving motor to perform driving independently to establish the pure electric mode; and when the power storage battery has insufficient amount of charge, the motor controller controls the engine to drive the generator to generate electricity, and controls the driving motor to perform driving independently to establish the extended range mode.

In an exemplary embodiment, when the vehicle is braking, the driving motor generates a braking torque to brake a wheel, and an induced current is generated in a motor winding thereof to charge the power storage battery.

Beneficial Effect

According to the hybrid power coupling mechanism and the vehicle provided by the embodiments of the present application, an engine and a generator are connected into a range extender, which operates in an extended range mode, and a driving motor is decelerated by a planetary gear set and inputs power to a differential mechanism, so that the structure is simplified, and a larger transmission ratio can be obtained. A clutch and a hydraulic system are cancelled, so that the structure is further simplified, the cost is low, and it is suitable for the hybridization of an A-class vehicle. A pure electric mode and an extended range mode can be achieved, the driving motor participates in driving during mode switching, and there is no power interruption.

Figure 1:
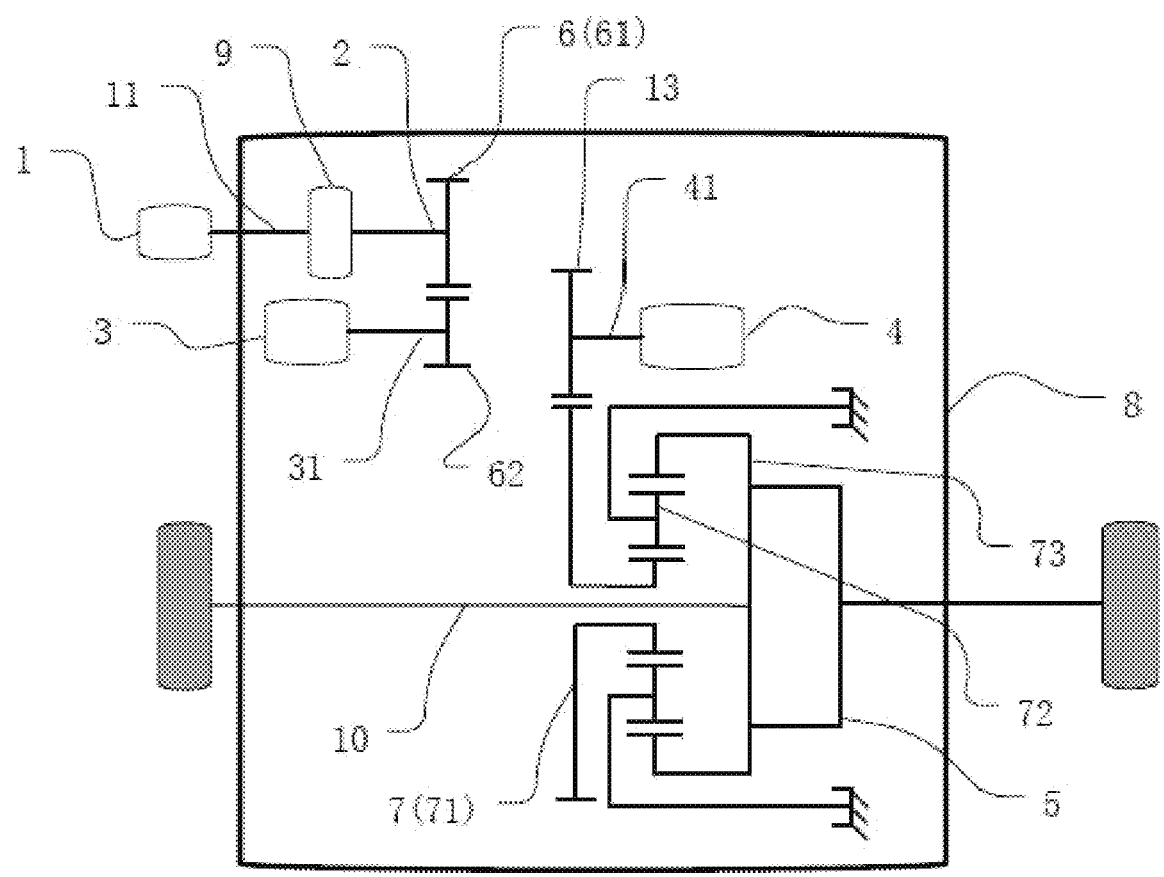
FIG. 1 is a structural schematic diagram of a hybrid power coupling mechanism according to an embodiment of the present disclosure.

The reference numerals in the specification are as follows:
1, engine; 11, rotating shaft of engine;
2, first output shaft;
3, generator; 31, input shaft of generator;
4, driving motor; 41, input shaft of driving motor;
5, differential mechanism;
6, speed-increasing gear pair; 61, first gear; 62, second gear;
7, planetary gear set; 71, sun gear; 72, planetary carrier; 73, gear ring;
8, housing; 9, torsion damper; 10, power output shaft; 13, third gear.

DETAILED DESCRIPTION OF THE EMBODIMENTS

In order to make the technical problems, technical solutions and beneficial effects of the present application clearer, the present application will be further described in detail below with reference to the accompanying drawings and embodiments. It is to be understood that the specific embodiments described herein are merely illustrative of the present application and are not intended to limit, the present application.

As shown in FIG. 1, a hybrid power coupling mechanism provided by the embodiments of the present application includes an engine 1, a first output shaft 2, a generator 3, a driving motor 4, and a differential mechanism 5, wherein the engine 1 and the generator 3 are arranged side by side, a rotating shaft 11 of the engine is connected to an input shaft 31 of the generator through the first output shaft 2, and an input shaft 41 of the driving motor is connected to the differential mechanism 5 through a planetary gear set 7.

During use, the engine 1, the generator 3 and the driving motor 4 are connected to a motor controller, which controls the engine 1, the generator 3 and the driving motor 4 and is connected to a power storage battery (battery for short).

According to the hybrid power coupling mechanism provided by the embodiments of the present disclosure, the engine 1 and the generator 3 are connected into a range extender, which operates in an extended range mode, and the driving motor 4 is decelerated by the planetary gear set 7 and inputs power to the differential mechanism 5, so that the structure is simplified, and a larger transmission ratio can be obtained. A clutch and a hydraulic system are eliminated, so that the structure is further simplified, the cost is low, and it is particularly suitable for the hybridization of an A-class vehicle. A pure electric mode and an extended range mode can be achieved, the driving motor 4 participates in driving during mode switching, and there is no power interruption.

In one embodiment, as shown in FIG. 1, the planetary gear set 7 includes a sun gear 71, a planetary carrier 72 and a gear ring 73; one side of the sun gear 71 is coupled to the input shaft 41 of the driving motor, and the other side of the sun gear 71 is meshed with an inner ring of the planetary carrier 72; and one side of the gear ring 73 is connected to the differential mechanism 5, and the other side of the gear ring 73 is meshed with an outer ring of the planetary carrier 72. On the one hand, it is advantageous to make the structure more compact, and on the other hand, it is able to obtain a larger transmission ratio.

In one embodiment, as shown in FIG. 1, the sun gear 71 is a hollow gear, and a power output shaft 10 connected to the differential mechanism 5 and configured to drive a wheel end penetrates through the sun gear 71. The power output shaft 10 is placed in an internal space of the hollow sun gear 71. The power output shaft 10 and the sun gear 71 take up less space and are compact in structure, and the size of the hybrid power coupling mechanism can be reduced.

In one embodiment, as shown in FIG. 1, the driving motor 4 and the differential mechanism 5 are arranged side by side, a third gear 13 is disposed on the input shaft 41 of the driving motor, and the sun gear 71 is meshed with the third gear 13. The structure is compact, and an axial size of the hybrid power coupling mechanism can be reduced.

In one embodiment, as shown in FIG. 1, the engine 1 and the generator 3 are arranged side by side, the rotating shaft 11 of the engine is connected to the first output shaft 2, and the first output shaft 2 is connected to the input shaft 31 of the generator through a speed-increasing gear pair 6. The engine 1 and the generator 3 are arranged side by side, and are connected by the speed-increasing gear pair 6, so that the operating range of the engine 1 during power generation is optimized, the power generation efficiency of the engine 1 is improved, and the axial size of the hybrid power coupling mechanism can be reduced.

In one embodiment, as shown in FIG. 1, the speed-increasing gear pair 6 includes a first gear 61 and a second gear 62 meshed with each other, the first gear 61 is connected to the first output shaft 2, the second gear 62 is connected to the input shaft 31 of the generator, and an outer diameter of the first gear 61 is greater than that of the second gear 62, so as to achieve speed-increasing from the engine 1 to the generator 3.

In one embodiment, as shown in FIG. 1, a housing 8 is further included. The generator 3, the driving motor 4, the planetary gear set 7 and the differential mechanism 5 are integrated in the housing 8. High integration is achieved, not only the structure integrated in the housing 8 is protected, but also assembly is facilitated, the space is saved, and the utilization of the interior space of the vehicle is improved. In an exemplary embodiment, the speed-increasing gear pair 6 is provided, the speed increasing gear pair 6 is also disposed in the housing 8.

In one embodiment, as shown in FIG. 1, the first gear 61, the second gear 62 and the third gear 71 are disposed between the engine 3 and the driving motor 4, and the first gear 61 and the second gear 62 are disposed on an axial outer side of the third gear 71. The structure is more compact, the utilization of the interior space of the housing 8 is improved, and a small-sized housing 8 can be selected.

In one embodiment, as shown in FIG. 1, the engine 1 is disposed outside the housing 8, and an end, connected to the first output shaft 2, of the rotating shaft 11 of the engine extends into the housing 8.

In one embodiment, as shown in FIG. 1, the hybrid power coupling mechanism includes a torsion damper 9 connected between the rotating shaft 11 of the engine and the first output shaft 2. The torsion damper 9 is configured to absorb vibration from the engine 1, thus avoiding the vibration transferring to the first output shaft 2, so that the uniformity of rotation of the first output shaft 2 can be improved.

Figure 2:
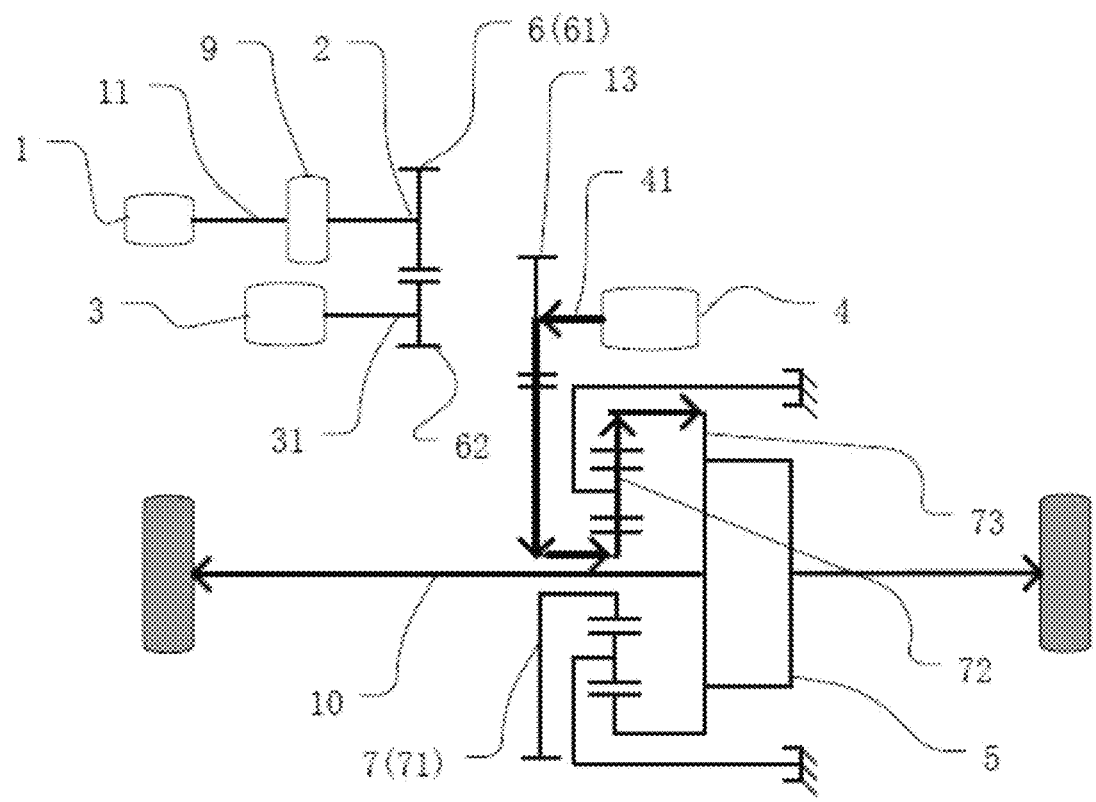
FIG. 2 is a schematic diagram of power transmission of a hybrid power coupling mechanism in a pure electric mode according to an embodiment of the present disclosure.
Figure 3:
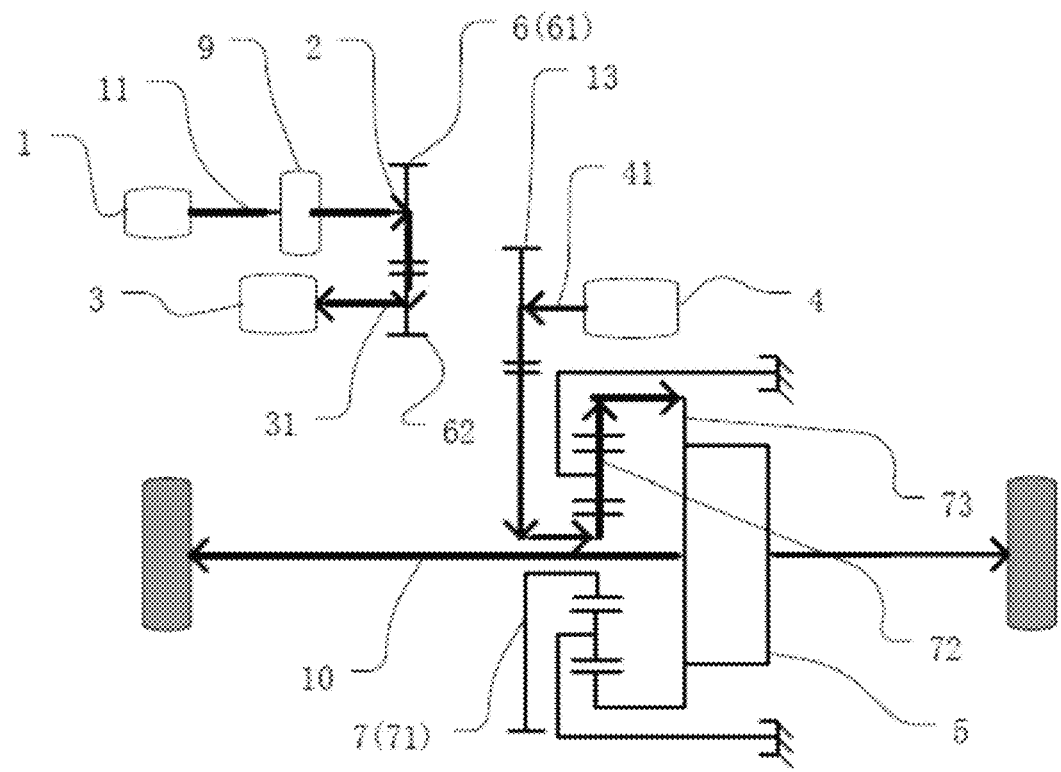
FIG. 3 is a schematic diagram of power transmission of a hybrid power coupling mechanism in an extended range mode according to an embodiment of the present disclosure.

In one embodiment, as shown in FIG. 2 and FIG. 3, when the power storage battery has sufficient charge, the engine 1 and the generator are controlled to be turned off, and the driving motor 4 performs driving independently to establish a pure electric mode.

When the power storage battery has insufficient amount of charge, the engine 1 drives the generator 3 to generate electricity, and the driving motor 4 performs driving independently to establish an extended range mode.

In one embodiment, two driving modes can be switched automatically according to an SOC (State of Charge) value of a battery and a vehicle speed requirement. A control method for switching driving modes includes the steps as follows.

Step S1, a magnitude relationship between an SOC value of a battery and a first threshold is determined, or a magnitude relationship between an SOC value of a battery and a first threshold and a magnitude relationship between a vehicle speed and a second threshold are simultaneously determined.

Step S2, driving modes of a hybrid power coupling mechanism are switched according to a determination result.

The first threshold is used to determine the level of the SOC value of the battery, and the second threshold is used to determine the level of the vehicle speed. In the present embodiment, the range of the first threshold and the second threshold is not limited. Generally, it can be freely set according to a specific control strategy. Under different control strategies, the values of the first threshold and the second threshold are different. After the first threshold and the second threshold are set, the system performs automatic determination, and automatically switches among three driving modes according to the determination result.

In addition, during vehicle brake, the driving motor 4 generates a braking torque to brake a wheel, and at the same time, an induced current is generated in a motor winding to charge the battery, so that recovery of braking energy can be achieved. Thus, the control method of the present embodiment may further include the step as follows.

Step S3, during braking, the driving motor 4 is controlled to generate a braking torque and an induced current is generated in a winding to charge the battery.

Refer to Table 1 for the conditions for establishing the two driving modes.

TABLE 1

Conditions for establishing two driving modes

| | Execution component | | Use condition | | |
|---|---|---|---|---|---|
| Mode | Motor | Generator | Driving motor | SOC | Speed |
| Pure electric mode | / | / | Drive | High | Full speed |
| Extended range mode | Power generation | Power generation, engine start | Drive | low | Low speed |

In addition, please refer to FIG. 2 for a power transmission route in the pure electric mode. Please refer to FIG. 3 for a power transmission route in the extended range mode. In FIG. 2 to FIG. 3, the path and direction of power transmission are indicated by black arrows. Final power is transmitted to the differential mechanism 5, and then transmitted to the wheel end. According to the working conditions of the entire vehicle, the hybrid power coupling mechanism may be switched between the pure electric mode and the extended range mode, the driving motor 4 participates in driving during mode switching, and there is no power interruption.

In one embodiment, either the generator 3 or the driving motor 4 is a motor/generator (M/G).

Some embodiments of the present disclosure also provide a vehicle, including a power storage battery, a motor controller connected to the power storage battery, and the hybrid power coupling mechanism according to any one of the foregoing embodiments, wherein the engine, the generator and the driving motor are connected to the motor controller and controlled by the motor controller. According to the foregoing hybrid power coupling mechanism, an engine and a generator are connected into a range extender, which operates in an extended range mode, and a driving motor is decelerated by a planetary gear set and inputs power to a differential mechanism, so that the structure is simplified, and a larger transmission ratio can be obtained. A clutch and a hydraulic system are eliminated, so that the structure is further simplified, the cost is low, and it is particularly suitable for the hybridization of an A-class vehicle. A pure electric mode and an extended range mode can be achieved, the driving motor participates in driving during mode switching, and there is no power interruption.

Specifically, when the power storage battery has sufficient amount of charge, the motor controller controls the engine and the generator to be turned off, and controls the driving motor to perform driving independently to establish the pure electric mode.

When the power storage battery has insufficient charge, the motor controller controls the engine to drive the generator to generate electricity, and controls the driving motor to perform driving independently to establish the extended range mode.

The above is only the preferred embodiment of the present application and is not intended to limit the present application. Any modifications, equivalent replacements, improvements and the like made within the spirit and principle of the present application shall fall within the scope of protection of the present application.

What is claimed is:

1. A hybrid power coupling mechanism, comprising an engine, a first output shaft, a generator, a driving motor, and a differential mechanism, wherein a rotating shaft of the engine is connected to an input shaft of the generator through the first output shaft, and an input shaft of the driving motor is connected to the differential mechanism in a speed-reducing manner through a planetary gear set; wherein the engine and the generator are arranged side by side, the first output shaft is connected to the input shaft of the generator through a speed-increasing gear pair.

2. The hybrid power coupling mechanism as claimed in claim 1, wherein the planetary gear set comprises a sun gear, a planetary carrier and a gear ring; one side of the sun gear is coupled to the input shaft of the driving motor, and the other side of the sun gear is meshed with an inner ring of the planetary carrier; and one side of the gear ring is connected to the differential mechanism, and the other side of the gear ring is meshed with an outer ring of the planetary carrier.

3. The hybrid power coupling mechanism as claimed in claim 2, wherein the sun gear is a hollow gear, and a power output shaft connected to the differential mechanism and configured to drive a wheel end passes through the sun gear.

4. The hybrid power coupling mechanism as claimed in claim 2, wherein the driving motor and the differential mechanism are arranged side by side, a third gear is disposed on the input shaft of the driving motor, and the sun gear is meshed with the third gear.

5. The hybrid power coupling mechanism as claimed in claim 1, wherein the rotating shaft of the engine is connected to the first output shaft.

6. The hybrid power coupling mechanism as claimed in claim 5, wherein the speed-increasing gear pair comprises a first gear and a second gear meshed with each other, the first gear is connected to the first output shaft, the second gear is connected to the input shaft of the generator, and an outer diameter of the first gear is greater than that of the second gear.

7. The hybrid power coupling mechanism as claimed in claim 5, further comprising a housing, wherein the generator, the driving motor, the speed-increasing gear pair, the planetary gear set and the differential mechanism are integrated in the housing.

8. The hybrid power coupling mechanism as claimed in claim 7, wherein the engine is disposed outside the housing, and an end, connected to the first output shaft, of the rotating shaft of the engine extends into the housing.

9. The hybrid power coupling mechanism as claimed in claim 5, wherein when the first gear, the second gear and the third gear are provided simultaneously, the first gear, the second gear and the third gear are disposed between the generator and the driving motor, and the first gear and the second gear are disposed on an outer side of the third gear with respect to an axial direction.

10. The hybrid power coupling mechanism as claimed in claim 1, further comprising a torsion damper connected between the rotating shaft of the engine and the first output shaft.

11. The hybrid power coupling mechanism as claimed in claim 1, wherein each of the generator and the driving motor is an electric generator.

12. The hybrid power coupling mechanism as claimed in claim 1, wherein the hybrid power coupling mechanism comprises a pure electric mode and an extended range mode, wherein
the engine and the generator are controlled to be turned off, and the driving motor performs driving independently to establish the pure electric mode; and
the engine drives the generator to generate electricity, and the driving motor performs driving independently to establish the extended range mode.

13. A vehicle, comprising a power storage battery and a motor controller connected to the power storage battery, and further comprising the hybrid power coupling mechanism as claimed in claim 1, wherein the engine, the generator and the driving motor are connected to the motor controller and controlled by the motor controller.

14. The vehicle as claimed in claim 13, wherein when the power storage battery has sufficient amount of charge, the motor controller controls the engine and the generator to be turned off, and controls the driving motor to perform driving independently to establish the pure electric mode; and
when the power storage battery has insufficient amount of charge, the motor controller controls the engine to drive the generator to generate electricity, and controls the driving motor to perform driving independently to establish the extended range mode.

15. The vehicle as claimed in claim 14, wherein when the vehicle is braking, the driving motor generates a braking torque to brake a wheel, and an induced current is generated in a motor winding thereof to charge the power storage battery.

16. The hybrid power coupling mechanism as claimed in claim 2, wherein the engine and the generator are arranged side by side, the rotating shaft of the engine is connected to the first output shaft, and the first output shaft is connected to the input shaft of the generator through a speed-increasing gear pair.

17. The hybrid power coupling mechanism as claimed in claim 3, wherein the engine and the generator are arranged side by side, the rotating shaft of the engine is connected to the first output shaft, and the first output shaft is connected to the input shaft of the generator through a speed-increasing gear pair.

18. The hybrid power coupling mechanism as claimed in claim 4, wherein the engine and the generator are arranged side by side, the rotating shaft of the engine is connected to the first output shaft, and the first output shaft is connected to the input shaft of the generator through a speed-increasing gear pair.

* * * * *